G. E. SPRAGUE.
RESILIENT WHEEL.
APPLICATION FILED SEPT. 18, 1912.
1,068,181. Patented July 22, 1913.
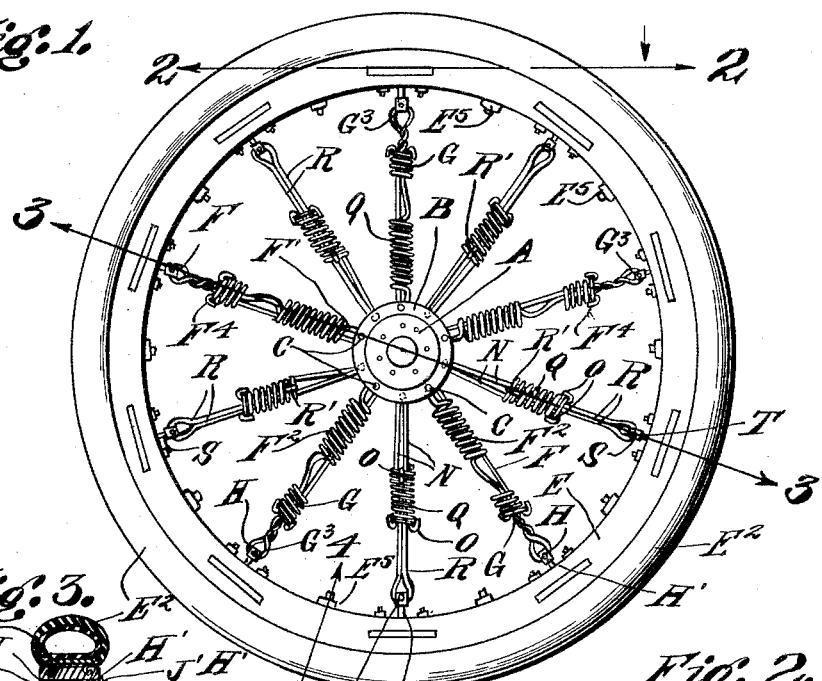
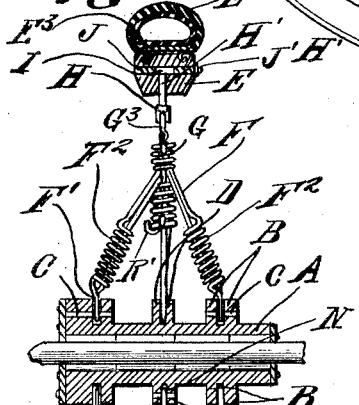
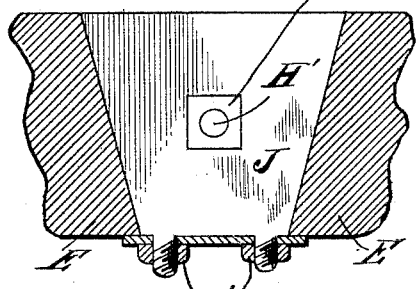
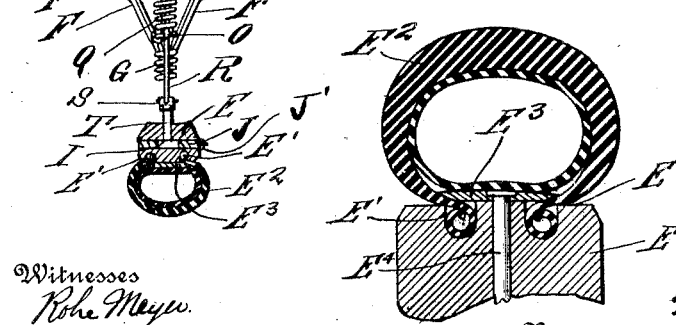
Witnesses
Robt. Meyer.
J. W. Sherwood.
Inventor
G. E. Sprague.
By Franklin H. Hough
Attorney
COLUMBIA PLANOGRAPH CO., WASHINGTON, D. C.

UNITED STATES PATENT OFFICE.

GEORGE EDWIN SPRAGUE, OF WEST END, ILLINOIS.

RESILIENT WHEEL.

1,068,181.    Specification of Letters Patent.    Patented July 22, 1913.

Application filed September 18, 1912. Serial No. 721,071.

*To all whom it may concern:*

Be it known that I, GEORGE E. SPRAGUE, a citizen of the United States, residing at West End, in the county of Saline and State of Illinois, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient wheels and comprises a simple and efficient device of this nature having various details of construction and combinations and arrangements of parts which will be hereinafter fully described, shown in the accompanying drawings and then specifically defined in the appended claims.

I illustrate my invention in the accompanying drawings, in which:—

Figure 1 is a side elevation of a resilient wheel made in accordance with my invention. Fig. 2 is a detail sectional view on line 2—2 of Fig. 1. Fig. 3 is a section on line 3—3 of Fig. 1, and Fig. 4 is a section on line 4—4 of Fig. 1.

Reference now being had to the details of the drawings by letter, A designates the hub of a wheel which may be provided with any suitable roller or ball-bearings as may be desired for the reception of an axle, and flanges B arranged in pairs and spaced apart project from said axle and carry pivotal pins C, and other flanges D radiate from the central portion of the axle and are spaced apart and carry pivotal pins D'. The felly of the wheel is designated by letter E and may be of any approved form. In the drawings, the felly is shown as having circumferential grooves E', and $E^2$ designates a tire, the marginal edges of which are held in said grooves by means of the plate $E^3$ which frictionally engages the tire and is held by means of the bolts $E^4$ passing through registering apertures in said plate and felly, the bolts being retained by nuts $E^5$. The spokes of the wheel are made up of resilient rods F arranged in pairs, each pair of spokes being made of a single rod and in diagonal relation with each other in order to securely brace the wheel. Each rod is bent upon itself to form loops F' which are fastened to pivotal pins C carried by the flanges B and said rod is bent to form coils $F^2$ through each of which an arm $F^3$ passes and which terminates in a hook $F^4$. The portions of the rods which form said coils extend through a coiled spring G over which the ends of the hooks $F^4$ engage. Said rod, after the two portions thereof pass through the coil $G^2$, is bent to form a loop $G^3$ which is connected to a swiveled head H of the bolt H', which latter has a squared portion. Said bolt H' has a threaded shank which engages a nut I which is mounted in an angular outlined opening in the wedge-shaped plate J which is seated in a similarly shaped slot formed transversely in the felly. It will be noted that the contact of the periphery of the nut with the wall of the angular-outlined opening in the plate J will prevent the nut from turning as the bolt is rotated. Nuts J' are fitted to the threaded lugs upon said plate and tend to securely hold the same within the slot in the felly, while the marginal edge of the opening in the plate serves to prevent the nut from rotation. The various spokes are made similarly and constructed as shown and described.

In order to further reinforce and brace the wheel, rods N are provided, each of which is bent upon itself to form a loop N' for engagement with the pins D' and each rod N has hooks O formed at its ends which engage over one end of the coiled spring Q and a rod R is bent upon itself at its longitudinal center and is pivotally connected to a swiveled head S upon a bolt T which is fastened to the felly in the same manner as before described of the bolts connecting the outer ends of the spokes. The ends of the rod R have hooks R' which engage over one end of a coiled spring through which the rod R passes.

By the provision of a resilient wheel made in accordance with my invention, it will be noted that the spokes with the resilient coil mounted as shown and described will serve to take up the vibration incident to a vehicle equipped with wheels passing over a rough road and, by reason of the arrangement of the spokes with portions at angles to each other, the wheel will be thoroughly braced. In the event of it being desired to adjust the tension of the spokes, it may be done by turning the bolts which has swiveled connections with the nuts in the felly, thus affording means for keeping the spokes at all times taut.

What I claim to be new is:—

1. A resilient wheel comprising a hub having flanges thereon arranged in pairs and spaced apart, pivotal pins fastened to said flanges, a felly, bolts carried by the felly and having swiveled heads, plates seated in the fellies and provided with openings, nuts mounted in said openings and engaged by said bolts, resilient spokes, each made up of a single rod which is bent at different locations to form loops engaging said pivotal pins upon the flanges, each rod bent to form coils which are disposed at inclinations to each other and each arm of the rod passing through a coil and terminating in a hook, a coiled spring over which said hooked ends engage, said rod passing through the coil engaged by said hooks and bent to form a loop having connection with the swiveled head of the bolt, as set forth.

2. A resilient wheel comprising a hub having flanges thereon arranged in pairs and spaced apart, pivotal pins fastened to said flanges, a felly, angled slots therein, bolts carried by the felly and having swiveled heads, wedge-shaped plates seated in said angled slots in the felly and provided with an opening, a nut seated in said opening and prevented thereby from rotation, resilient spokes, each made up of a single rod which is bent at different locations to form loops engaging said pivotal pins upon the flanges, each rod bent to form coils which are disposed at inclinations to each other and each arm of the rod passing through a coil and terminating in a hook, a coiled spring over which said hooked ends engage, said rod passing through the coil engaged by said hooks and bent to form a loop having connection with the swiveled head of the bolt, as set forth.

3. A resilient wheel comprising a hub having flanges thereon arranged in pairs and spaced apart, pivotal pins fastened to said flanges, a felly, angled slots therein, bolts carried by the felly and having swiveled heads, wedge-shaped plates seated in said angled slots in the felly and provided with an opening, a nut seated in said opening and prevented thereby from rotation, integral threaded lugs upon said plate, nuts fitted thereon to hold the plate in place, resilient spokes, each made up of a single rod which is bent at different locations to form loops engaging said pivotal pins upon the flanges, each rod bent to form coils which are disposed at inclinations to each other and each arm of the rod passing through a coil and terminating in a hook, a coiled spring over which said hooked ends engage, said rod passing through the coil engaged by said hooks and bent to form a loop having connection with the swiveled head of the bolt, as set forth.

4. A resilient wheel comprising a hub having flanges thereon arranged in pairs and spaced apart, pivotal pins fastened to said flanges, a felly, bolts carried by the felly and having swiveled heads, plates seated in the fellies and provided with openings, nuts mounted in said openings and engaged by said bolts, resilient spokes, each made up of a single rod which is bent at different locations to form loops engaging said pivotal pins upon the flanges, each rod bent to form coils which are disposed at inclinations to each other and each arm of the rod passing through a coil and terminating in a hook, a coiled spring over which said hooked ends engage, said rod passing through the coil engaged by said hooks and bent to form a loop having connection with the swiveled head of the bolt, rods bent upon itself to form loops and positioned intermediate the resilient spokes and terminating at their ends in hooks, one of said intermediate rods pivotally connected to the hub and the other to the felly, and a coiled spring engaged by the hooks upon said intermediate rods, as set forth.

In testimony whereof I hereunto affix my signature in the presence of two witnesses.

GEORGE EDWIN SPRAGUE.

Witnesses:
E. J. HOBBS,
S. P. MCFARLAND.

Copies of this patent may be obtained for five cents each, by addressing the "Commissioner of Patents, Washington, D. C."